(12) United States Patent
Hernandez

(10) Patent No.: US 11,650,488 B2
(45) Date of Patent: May 16, 2023

(54) PET GAZE ATTRACTANT TOWARD A CAMERA

(71) Applicant: Jason Hernandez, San Diego, CA (US)

(72) Inventor: Jason Hernandez, San Diego, CA (US)

( * ) Notice: Subject to any disclaimer, the term of this patent is extended or adjusted under 35 U.S.C. 154(b) by 0 days.

(21) Appl. No.: 17/112,179

(22) Filed: Dec. 4, 2020

(65) Prior Publication Data

US 2022/0179295 A1    Jun. 9, 2022

(51) Int. Cl.
G03B 17/56 (2021.01)
A01K 15/02 (2006.01)
G06V 40/10 (2022.01)

(52) U.S. Cl.
CPC .......... *G03B 17/566* (2013.01); *A01K 15/026* (2013.01); *G06V 40/10* (2022.01)

(58) Field of Classification Search
CPC ...... G03B 17/56; G03B 17/566; G06V 40/10; A01K 15/026
See application file for complete search history.

(56) References Cited

U.S. PATENT DOCUMENTS

2017/0082910 A1*   3/2017  Hernandez ..........  H04M 1/0254

FOREIGN PATENT DOCUMENTS

CN    207884693 U  *  9/2018

* cited by examiner

*Primary Examiner* — Clayton E. LaBalle
*Assistant Examiner* — Fang-Chi Chang
(74) *Attorney, Agent, or Firm* — Donn K. Harms

(57) ABSTRACT

A gaze-attracting device is provided having a body which is removably engageable to a camera or smartphone. The body of the device is configured with a recess which will hold food or a toy therein, to attract the gaze of an animal being photograhed such as a dog or cat. Additional gaze attracting for longer gaze time periods is provided by the inclusion of facial indicia of a small animal, such as eyes, ears and a nose, on a front facing surface of the body.

7 Claims, 4 Drawing Sheets

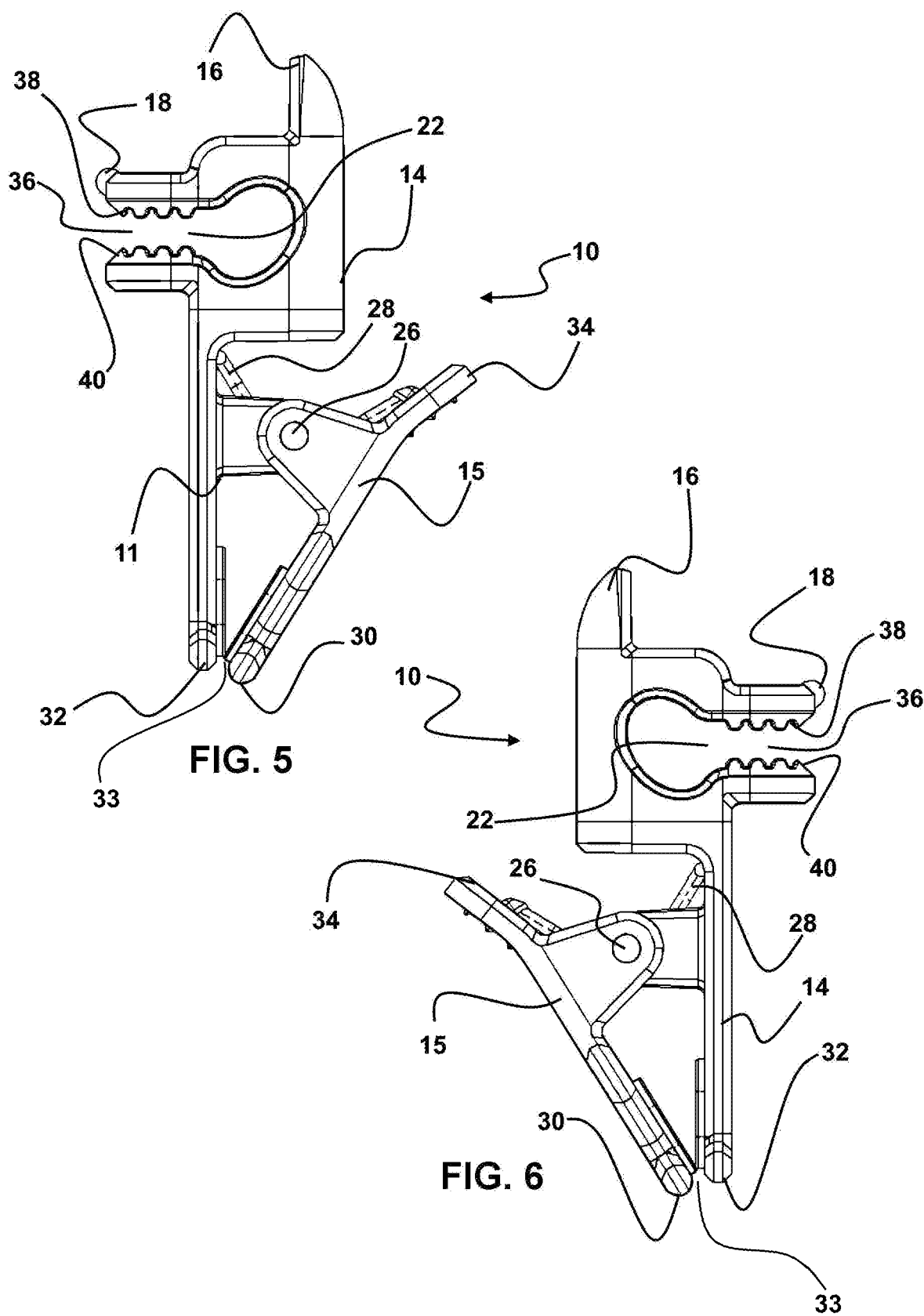

PET GAZE ATTRACTANT TOWARD A CAMERA

BACKGROUND OF THE INVENTION

1. Field of the Invention

The present invention relates generally to a method and apparatus for capturing and maintaining the gaze of a pet toward a camera. More particularly, the invention relates to a device configured for removable engagement to a variety of photographic devices such as smartphones, electronic cameras, pads, and the like, which is configured in appearance to attract the gaze of an animal such as a dog, and which is configured to hold food as another attractant of the gaze of the intended animal toward the camera lens.

2. Prior Art

In recent years, the improvements in digital photography have allowed for the inclusion of high quality cameras in a wide variety of digital devices. However, be it a film camera or a modern digital camera device such as those in a smart phone, when it comes to taking portraits and similar photos of inattentive subjects such as dogs, it is hard to capture their attention and gaze toward the camera lens.

While a similar problem exists in photographing young children, generally they learn that they must turn their heads toward the camera when asked. However, with animals such as dogs, while their gaze can usually be attracted by the voice of their owner, looking in a particular voice-induced direction is short lived. Such animals have no concept of a photograph or any need to maintain their gaze toward the camera lens prior to the activation of the shutter. Further, where the pet owner wishes to be in the same photograph frame as the pet, for photos such as "selfies" the pet is more likely than not, to look at the adjacent pet owner, rather than the camera lens.

As a result, photographers taking photos of their pets can be constantly frustrated with the resulting photos with their pet, when their pet has turned their head toward their owner, or otherwise looked away from the camera lens.

In the past, photographers have attempted to attract the attention of their pet by waving or holding food or a toy or the like in one hand, while waiting for the subject of their photo to turn their head. Such has not worked well and frequently results in the photo being ruined by the movement of the photographer waving the object while trying to hold the camera in the other hand. Further, it is impossibly hard to position the object in line with the lens in most cameras and to hold the object inline with the front of the lens will ruin the shot. To position it behind the camera prevents the user from looking through the viewfinder or at the video display. As digital cameras have gotten smaller and been included in other devices such as smartphones and pad computers, the problem has ensued and gotten worse due to the small size of lenses and their sometimes odd placement on the electronic device.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device and system herein disclosed, provides users with a means to position a gaze attracting object, such as food or a toy, adjacent and substantially inline with a camera lens. This positioning provides a means to attract the gaze of a pet toward the camera lens for a photo. Further, the device itself is configured in a particularly preferred mode, to resemble another animal as such has been found in experimentation to significantly increase the attentiveness of the attracted gaze of a pet such as a dog.

As disclosed and described herein, the gaze attracting device herein thereby provides a solution to the shortcomings in the current and prior art of gaze attracting components for photos of animals such as dogs or cats and the like. The device features a camera-engageable body or housing which is configured on a first end for an easy and removable compressive engagement to one or a plurality of electronic and film cameras. The device, thus, while adapted to engage upon older style film cameras, is especially well configured for engagement upon an edge of an electronic photography device such as a digital camera, a smart phone, a pad computer, and other electronic devices having a camera lens and built in photo processor for capturing digital images therethrough.

Further, in a particularly preferred mode of the device herein, it has been found unexpectedly during experimentation, that forming the body of the device in the shape of an animal, and including facial features thereof, such as ears and a nose and eyes, significantly enhances the function of the device, to attract the gaze of a pet such as a dog, toward the camera-mounted device. Further, by forming a compressive mouth area on the body of the device, which is configured to hold food such as pet treats, the device has shown in experimentation to cause pets and the like, to look toward the device and the adjacent camera lens, and to hold that gaze for longer periods of time, than if the body were formed in a simple square or round shape.

On the opposite end of the body of the device, a compressive engagement with a smartphone or digital camera or the like is provided by a gap between a first body portion and a second body portion which is in a biased rotational engagement to the first body portion of the device. Compression by the user to a ledge formed on the second body portion will overcome the bias of a spring or the like, and allow for a temporary gap to form between the first and second body portions. Once the camera is positioned in between the first and second body portions, the user can removably engage the device to the camera by releasing the pressure upon the ledge thereby causing a compressive engagement of the camera in between the first and second body portions.

With respect to the above description, before explaining at least one preferred embodiment of the herein disclosed invention in more detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods, and systems for carrying out the removable positioning of a gaze attractant which will hold food or tows, to an electronic or other camera device and the several purposes of the present disclosed device. It is important, therefore, that the claims be regarded as including such equivalent construction and methodology insofar as they do not depart from the spirit and scope of the present invention.

The objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings:

FIG. 5 depicts the device from a first side view, showing the first body portion which is in a rotational engagement to the second body portion, and showing a second end of the body which may be separated to engage upon a camera.

FIG. 6 shows an opposite view of the device as in FIG. 6.

DETAILED DESCRIPTION OF THE PREFERRED EMBODIMENTS OF THE INVENTION

Figure 1:
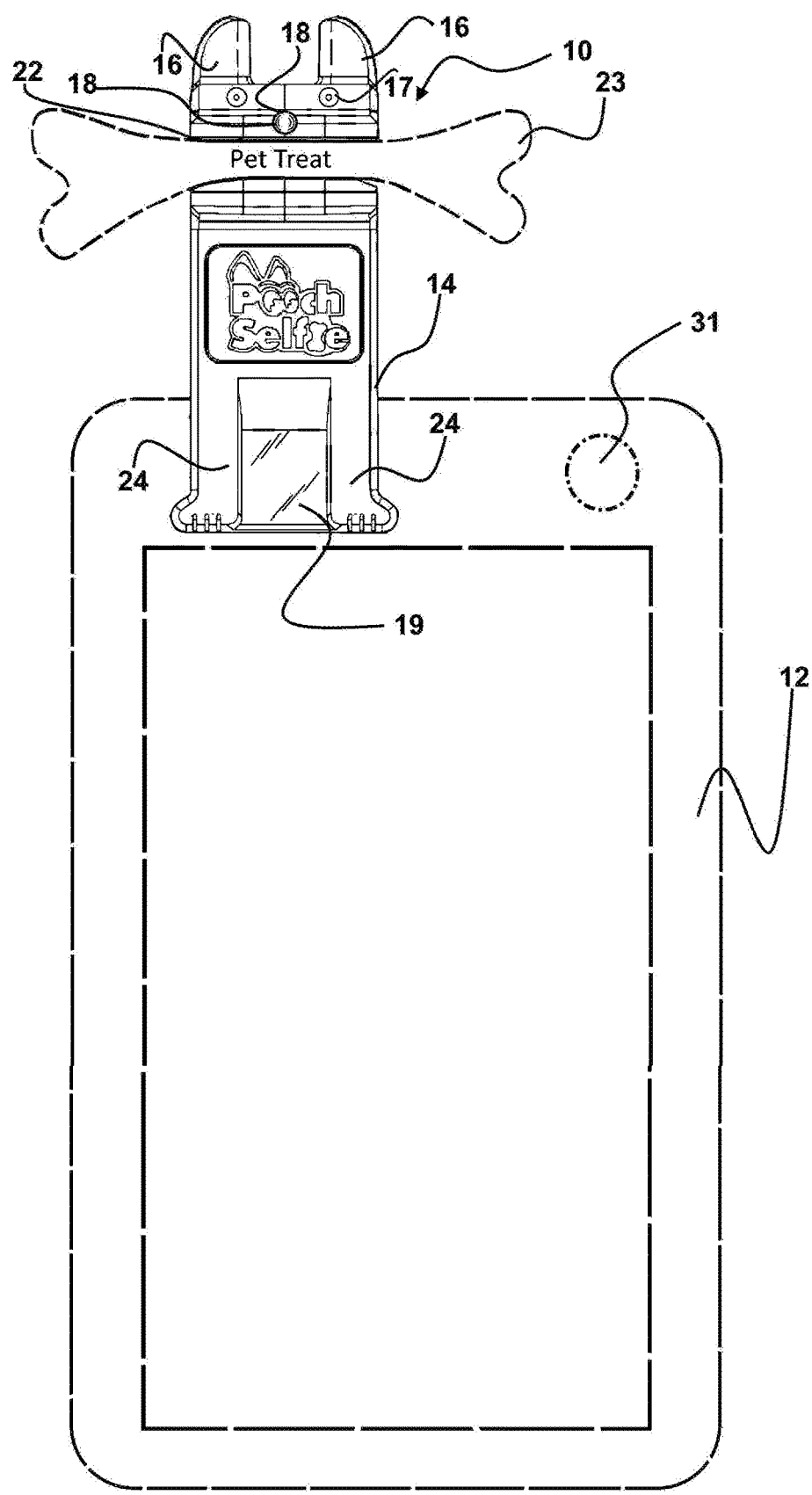
FIG. 1 depicts a mode of the device herein where the body thereof is shown in an as-used position with a first end of the body thereof in an engagement with a side edge of a camera and showing a preferred shape and appearance of the device itself as a small animal, and which is capable of actually holding food or a toy in a discernable mouth area.

In this detailed description, the directional and locational terms and prepositions of up, upwardly, down, downwardly, front, back, top, upper, bottom, lower, left, right, first, second, and other such terms, are employed to refer to the device as it is oriented and appears in the drawings and are used for convenience only. Such terms they are not intended to be limiting in any fashion, or to imply that the device has to be used or positioned in any particular orientation. Further, such locational and directional terms may vary in the claims herein due to differing elements included in the order and drafting of the claims. Additionally, if not otherwise defined, where employed with reference to distance, size, or an angle or other measurement, by the term substantially is meant, plus or minus five percent.

Now referring to drawings in FIGS. 1-9, wherein similar components are identified by like reference numerals, there is seen in FIG. 1 a favored mode of the device 10 depicted in an as-used positioning. By as-used positioning is meant that the device 10 is removably engaged to a camera capable component such as that of a smartphone 12, by compressive or frictional engagement thereto. The term smartphone 12 as used herein, means any film or digital camera device which has a lens for taking photographs, and is not intended to be limiting, but is used for convenience of reading this specification.

Figure 3:
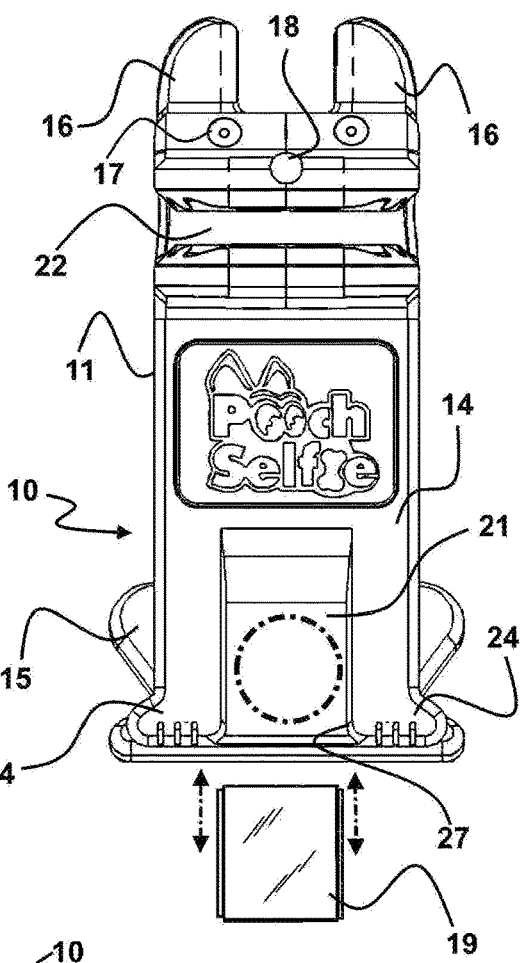
FIG. 3 depicts a view of the device as in FIG. 2 and includes molded eyes or indicia defining eyes, along with the nose and mouth, and shows a removable body section which may cover an opening configured for positioning around a camera lens.
Figure 4:
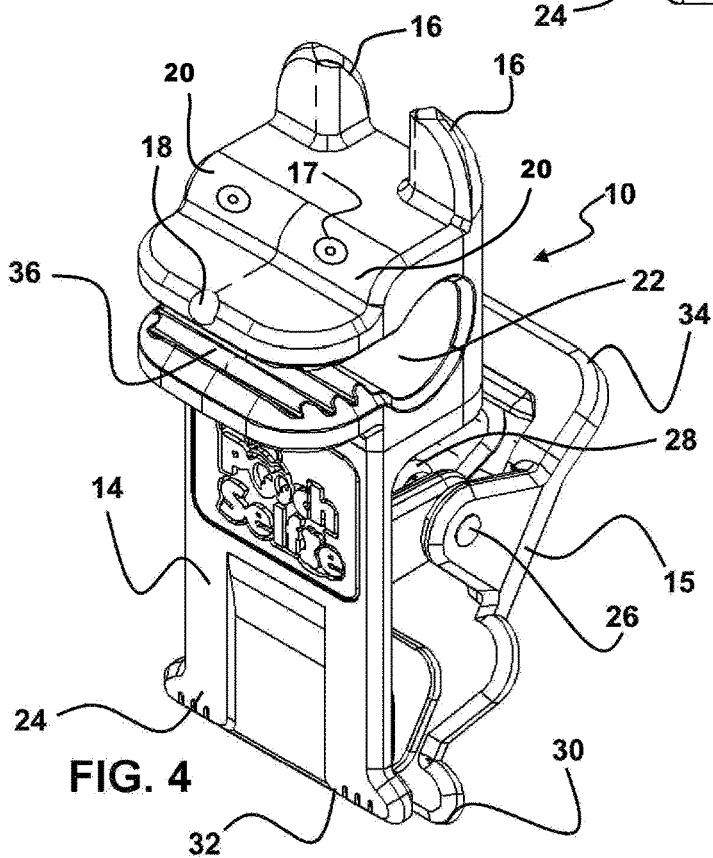
FIG. 4 is a perspective view of the device of FIGS. 1-3, showing the shape of the device as a small animal with ears, eyes or eye areas, a nose, and a mouth area and configured to compressively removably engage with food or a toy.

As shown in FIG. 1 and more clearly in the perspective view of FIG. 4 or side view of FIG. 5, the device 10 has body 11 which includes a first body portion 14 pivotally engaged with a second body portion 15. The first body portion 14, preferably, has facial indicia thereon, which is either printed or more preferably engraved or molded thereon, in combination with formed projecting areas thereof, to make the first body 14 portion appear from the front view of FIGS. 1-3, as a small animal.

By the device 10 having the appearance of a small animal is meant a small version of a dog, or cat or mouse, squirrel or other small animal which dogs or cats or other pets will normally chase, and where the first body portion 14 has formed thereon, at least a plurality of a group of facial indicia features.

By facial indicia features is meant, molding or otherwise forming the device 10, with shapes of one or a combination of facial indica features from a group of facial indica features, including, ears 16, a nose 18, a mouth 22, and eyes 17 or eye areas situated between the ears 16 and nose 18.

In a most preferred mode of the device 10 which has shown in experimentation to enhance the gaze attraction of a dog or cat, facial indicia, including the facial indicia features of at least the ears 16 projecting to form a silhouette with a gap between two ears, and a recess or other defined area forming a mouth 22, worked substantially better to attract that gaze then the device 10 with just a mouth 22 or area to hold a treat. However, the addition of secondary facial indicia features of a nose 18, and eyes 17, or eye areas in between the ears 16 and nose 18, were found to hold the gaze of the dog or cat for a time duration longer than a version of the device 10 without such. Supplemental attractant indicia such as legs 24 of a body area might also be optionally included.

As such, the inclusion of all of the facial indicia features is desirable to form the device 10 which functions best to quickly attract the gaze of a small animal or pet, and, to hold that gaze for a longer period of time.

The animal facial characteristics can be imparted to the device 10 just by shaping the first body portion 14 to form a silhouette with the ears 16 and a physical shape for the nose area 18 and recesses or curves to form the eye areas 20, or some or all might be silk screened or pad printed with indicia showing these physical characteristics. In experimentation with different modes of the device 10 it was found that forming the ears 16 as projections that form a silhouette of a head shape with ears worked best to almost instantly capture the attention of the pet viewing it, and such is preferred in all modes where animal facial characteristics are included in the first body portion 14.

As noted above, that while the body 11 could be formed with no animal characteristics, such as with just a smooth exterior, and could hold food or a toy, to attract the gaze of a pet, that the attraction and duration of that attraction to a pet is significantly enhanced where the body 11 is configured to appear as a small animal. This is especially true with dogs where the appearance is that of a small mammal such as a mouse or squirrel, and with cats where the appearance is a small mammal such as a mouse or a bird. Where an insertable gaze attractant such as food 23 or a toy is placed in a mouth area 22, the gaze attraction is further enhanced as is the duration of that gaze.

Figure 2:
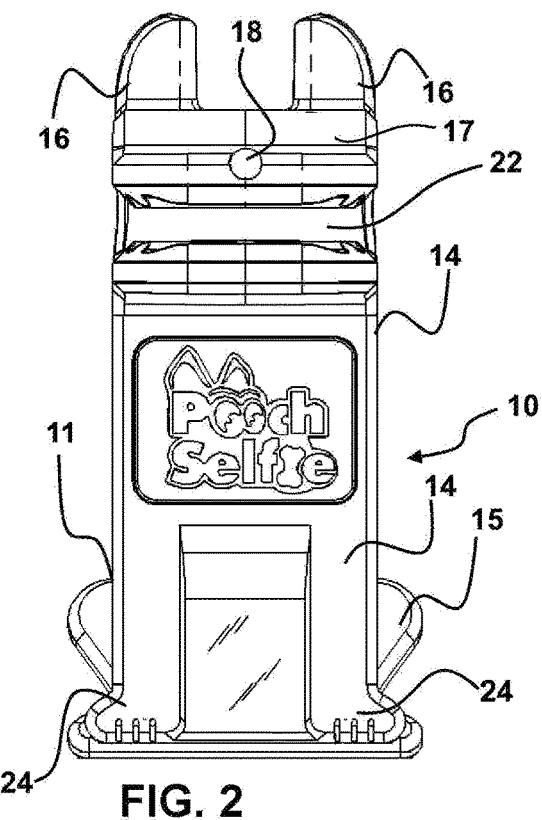
FIG. 2 shows a view of the body of the device of FIG. 1 in an unengaged position showing the shape being one which is of a small animal with eyes which are shown as eye areas and having the appearance of a nose and a mouth of a small animal.

In FIG. 2 is shown a detached view of the device 10 of FIG. 1 in a removed position. As shown, the first body portion 14 has a shape with projections and recesses and/or indicia, which renders the first body portion 14 to have the facial indicia features providing the appearance of a small animal, such as with eyes 20 and a nose 18 and a mouth 22. As noted below, the mouth 22 of the first body portion 14 is configured for a compressive engagement of food 23 or a toy or the like by forming the first body portion 14 from polymeric material which will flex and rebound. In FIG. 2, the eyes 17 are shown as formed as two eye areas with a divider therebetween, and where the term eyes 17 is used herein, such eye areas or considered to be included.

Depicted in FIG. 3 is a view of the device 10 as in FIG. 2, and shows a removable body section 19 which may cover a lens gap 21 located at the second end 32 of the first body portion 14. The body section 19 may snap into the lens gap 21 or slide into a slot 27 which communicates with the second end 32 of the first body portion 14, or may otherwise removably engage at the second end 32 of the first body portion 14, so the user may engage the device 10 with the first body portion 14 directly over and aligned with a camera lens 31 (FIG. 1) of a digital device having a camera therein.

Shown in FIG. 4 is a perspective view of the device 10 herein, showing the first body portion 14 in a pivoting engagement 26 to the second body portion 15. A biasing member 28 such as a spring, is operatively connected to the pivoting engagement 26 such that a second end 30 of the second body portion 15 is forced toward a second end 32 of the first body portion 14. In this biased pivoting engagement 26, compression force by a user imparted to the first end 34 of the second body portion 15 will cause a separation of a gap area 33 between the second end 32 of the first body portion and the second end 30 of the second body portion, to form a temporary widening of the gap area 33, to allow a compressive engagement to a camera such as the smart phone 12 such as shown in the compressive engagement in FIG. 1.

Also shown in FIG. 4, the shape of the device 10 as a small animal with ears 16, eyes 20, a nose 18, and a mouth area 22. This shape is additionally depicted in FIGS. 5-6 which show opposite sides of the device 10. In these figures, the mouth area 22 includes a recess 36 formed into the front surface of the first body portion 14, which has a static spacing between a top surface 38 and a bottom surface 40. However, in the simplest mode of the device 10, where it has little or no facial indicia, the recess 36 will be included such that a treat or other food 23 can be inserted in the recess 36, and held there to appear to be engaged in the mouth of the device 10, to attract the gaze of the intended subject such as a dog or cat.

As shown in multiple figures herein, the body 11, has a recess 36 formed into the front surface of the first body portion 14, which is configured to form a compressive connection with a gaze attractant such as food 23 or a toy positioned therein. By the use of the term food 23 herein, is meant a gaze attractant, from a group of gaze attractants including food or a toy that would cause that gaze attraction.

Thus food 23 is used for convenience and is meant to be a gaze attractant chosen from a group of gaze attractants including food and toys.

The body 11 of the device 10 being formed of elastic or polymeric material, will flex under pressure. Thus food 23 or a toy, wider than the recess 36 is insertable therein, wherein the top surface 38 will deflect temporarily away from the bottom surface 40. However, once the force or pressure pushing on the food or toy ceases, a compressive connection is formed for food 23 or a toy positioned in the recess 36, by the biasing of the elastic or polymeric body 11 to return the top surface 38 and bottom surface 40 to rebound and move toward the static or fixed recess 36 between them.

Also shown in FIGS. 5-6, is that the device 10 is configured to form a compressive engagement with a camera device, such as a small camera or smartphone 12, in a gap area 33 located at the second end of the device 10. By second end of the device 10 is meant the gap area 33 located in-between the second end 32 of the first body portion 14 and second end of the second body portion 15.

The gap area 33, will enlarge in width a distance which is sufficient to engage over a camera device such as a small camera or a smartphone 12, when the user compresses the opposite ends of the first body portion 14 and second body portion 15 with sufficient force to temporarily overcome the biasing member 28. Once the camera such as a smartphone 12 is slid into the enlarged gap area 33, the release of compression imparted by the fingers of the user, will cause the second end 30 of the first body portion 14 and the second end 32 of the second body portion 15, to form a compressive engagement upon the camera device such as a small camera or smartphone 12.

Figure 7:
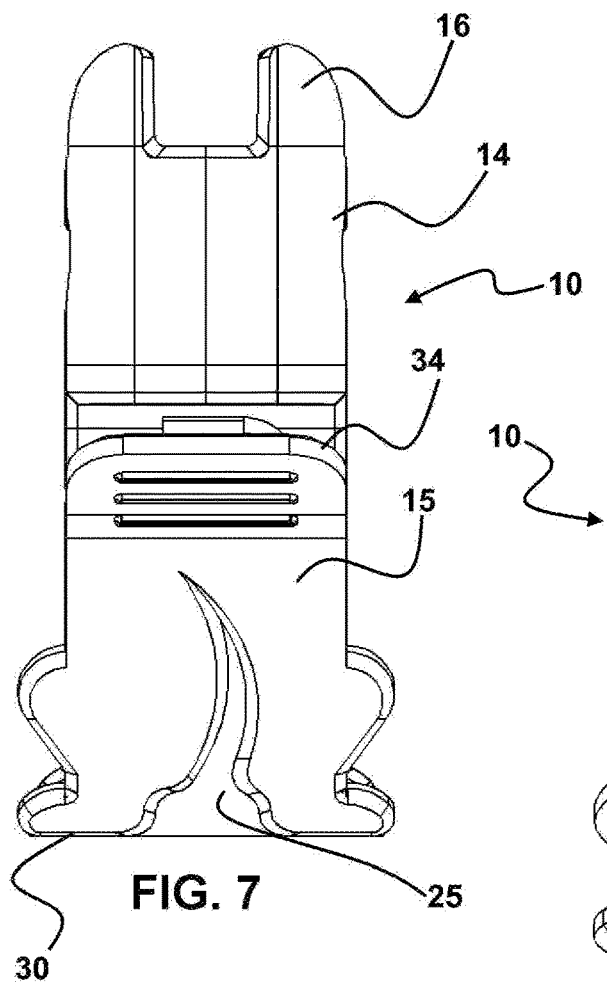
FIG. 7 shows a rear view of the device herein showing indicia printed or engaged onto a second body portion 15 which appears as an animal tail.

In FIG. 7 is shown a rear view of the device 10 herein. As shown, a tail 25 may be included in the animal characteristics upon the surface of the device 10.

Figure 8:
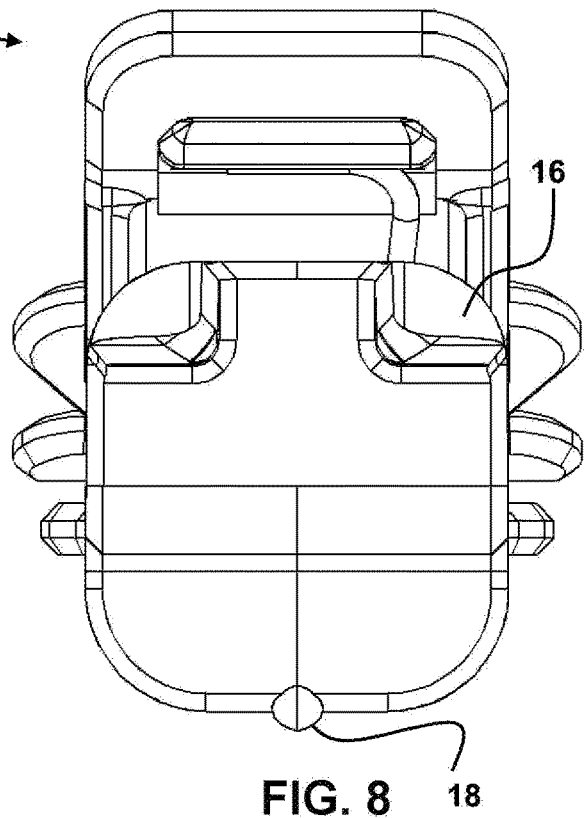
FIG. 8 shows the device of FIG. 1 from a top view thereof.

In FIG. 8, a top or end view of the device 10 is shown, and animal appearance characteristics such as the ears 16 and nose 18 can be seen.

Figure 9:
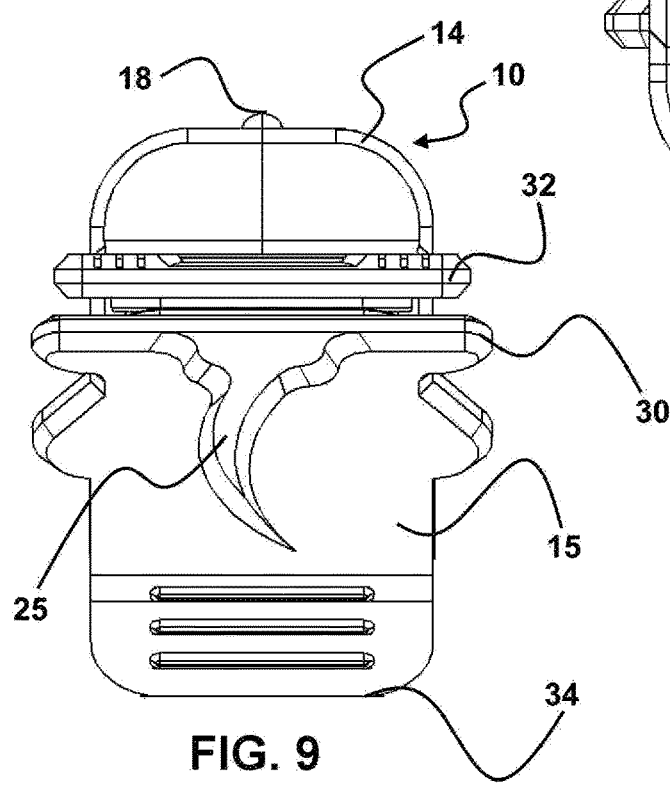
FIG. 9 shows a bottom view of the device herein of FIG. 1.

Shown in FIG. 9 is a bottom view of the device 10 herein of FIG. 1. As can be seen the tail 25 animal characteristic is viewable as is the nose 18 animal characteristic.

It should be noted while described herein and shown in the drawings, this invention has other applications, potentially, and one skilled in the art could discover these. The explication of the features herein and in the drawings of this invention does not limit the claims of this application.

It is additionally noted and anticipated that although the device is shown in its most simple form, various components and aspects of the system disclosed may be differently configured or slightly modified when forming the invention herein. As such, those skilled in the art will appreciate the descriptions and depictions set forth in this disclosure or merely meant to portray examples of preferred modes within the overall scope and intent of the invention, and are not to be considered limiting in any manner.

While all of the fundamental characteristics and features of the gaze attracting invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. A gaze-attracting apparatus comprising:
   a body, said body having a first body portion and a second body portion;
   said first body portion extending between a first end thereof, to a second end thereof;
   said second body portion extending between a first end thereof and a second end thereof;
   said first body portion in a pivoting engagement to said second body portion;
   a gap area positioned in between said second end of said first body portion and said second end of said second body portion;
   said gap area positionable in a compressive engagement of said gap area, with a smartphone, to position said body in an as-used position;
   said first body portion having a front surface area; and
   a recess formed into said front surface area of said first body portion, said recess configured for compressive holding of a first gaze attractant therein, said first gaze attractant being one of a group of first gaze attractants including food and toys;
   facial indicia positioned upon said front surface area;
   said facial indicia defining a secondary gaze attractant of said gaze of said animal being photographed;
   said facial indicia being one or a combination of facial indicia features from a group of facial indicia features, including ears, a nose, a mouth, and eyes;
   said recess defines said mouth; and
   whereby with said body in said as-used position, the gaze of an animal being photographed is attracted toward said body and said smartphone.

2. The gaze-attracting apparatus of claim 1, additionally comprising:
   a biasing member operatively engaged with said body; and
   said biasing member biasing said second end of said first body portion and said second end of said second body portion toward each other in said compressive engagement of said gap area, with said smartphone.

3. The gaze-attracting apparatus of claim 2, additionally comprising:
   a lens gap communicating through said first body portion;
   said lens gap positioned at said second end of said first body portion; and
   said lens gap aligning with a lens of a camera of said smartphone with said body in said as-used position.

4. The gaze-attracting apparatus of claim 1, wherein said front surface of said body includes all of said facial indicia features from said group of facial indicia features.

5. The gaze-attracting apparatus of claim 4, additionally comprising:
   a lens gap communicating through said first body portion;
   said lens gap positioned at said second end of said first body portion; and
   said lens gap aligning with a lens of a camera of said smartphone with said body in said as-used position.

6. The gaze-attracting apparatus of claim 4, additionally comprising:
   supplemental attractant indicia forming a pair of legs positioned on said front surface; and
   on each of said pair of legs respectively positioned on opposite sides of said lens gap.

7. The gaze-attracting apparatus of claim 1, additionally comprising:
   a lens gap communicating through said first body portion;
   said lens gap positioned at said second end of said first body portion; and
   said lens gap aligning with a lens of a camera of said smartphone with said body in said as-used position.

* * * * *